Figure 1:
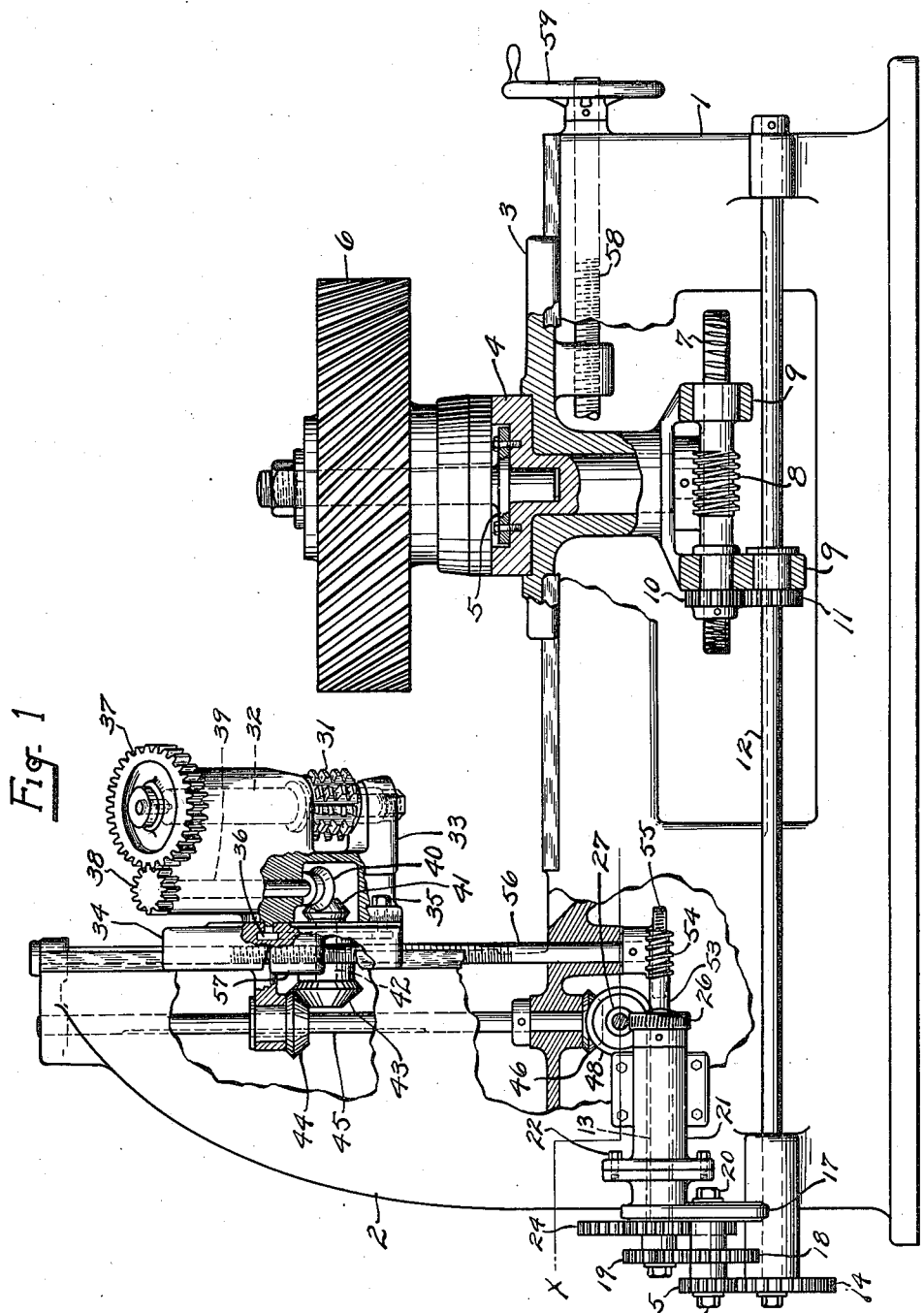

F. L. EBERHARDT & W. F. ZIMMERMANN.
METHOD OF CUTTING HELICAL GEAR WHEELS.
APPLICATION FILED NOV. 15, 1910.

1,036,199.

Patented Aug. 20, 1912.

2 SHEETS—SHEET 1.

WITNESSES.
B.E. Barnes
Joseph Cesar

INVENTORS.
Frederick L. Eberhardt and
William F. Zimmermann.
BY Wm. F. Zimmermann
ATTORNEY F. L. EBERHARDT & W. F. ZIMMERMANN.
METHOD OF CUTTING HELICAL GEAR WHEELS.
APPLICATION FILED NOV. 15, 1910.

1,036,199.

Patented Aug. 20, 1912.

2 SHEETS—SHEET 2.

WITNESSES.
B. E. Barnes.
Joseph Cesar

INVENTORS.
Frederick L. Eberhardt and
William F. Zimmermann.
BY William F. Zimmermann.
ATTORNEY.

UNITED STATES PATENT OFFICE.

FREDERICK L. EBERHARDT AND WILLIAM F. ZIMMERMANN, OF NEWARK, NEW JERSEY, ASSIGNORS TO GOULD & EBERHARDT, OF NEWARK, NEW JERSEY, A CORPORATION OF NEW JERSEY.

METHOD OF CUTTING HELICAL GEAR-WHEELS.

1,036,199. Specification of Letters Patent. Patented Aug. 20, 1912.

Original application filed February 18, 1907, Serial No. 357,782. Divided and this application filed November 15, 1910. Serial No. 592,453.

*To all whom it may concern:*

Be it known that we, FREDERICK L. EBERHARDT and WILLIAM F. ZIMMERMANN, citizens of the United States, and residents of the city of Newark, in the county of Essex and State of New Jersey, have invented certain new and useful Improvements in Methods of Cutting Helical Gear-Wheels, and do hereby declare the following specification, taken in connection with the drawings forming a part of the same, to be a full, clear, and exact description of the principle of said invention and the best mode contemplated to apply said principle, so as to distinguish it from the other inventions.

The invention relates primarily to a method of generating the teeth of helical gear wheels, without imparting a differential motion to either the blank to be cut or to the cutter therefor, and more particularly to a method employing a helical or hob cutter.

This application is a division of the application for universal gear cutters filed Feb. 18th, 1907, by the applicants, Serial Number 357,782.

The object of this invention is to provide a method of cutting helical gear wheels, with a helical cutter, by imparting a constant relative rotational motion to said cutter and blank in contradistinction to a differential motion and of feeding said cutter parallel to the axis of said gear blank and relatively to said constant rotational motion. The rotational and feeding motion of the cutter and the rotational motion of the blank are in accordance with a mathematical formula whereby the different relative ratios may be obtained for the various gear wheels to be cut. The feeding motion may be relative to either the rotation of the cutter or of the gear blank. The formula as hereinafter deduced is based on a feeding motion relative to the rotations of the cutter.

The annexed drawings and the description thereof set forth in detail, certain mechanism, embodying means constituting, however, but one of the various mechanical forms in which the principle of the invention may be used.

The novelty of the invention will be readily understood from the drawings, which show a gear cutting machine for practising the invention in its preferred form, and from the following description thereof. The novelty is more particularly pointed out in the claims annexed to said description.

Figure 2:
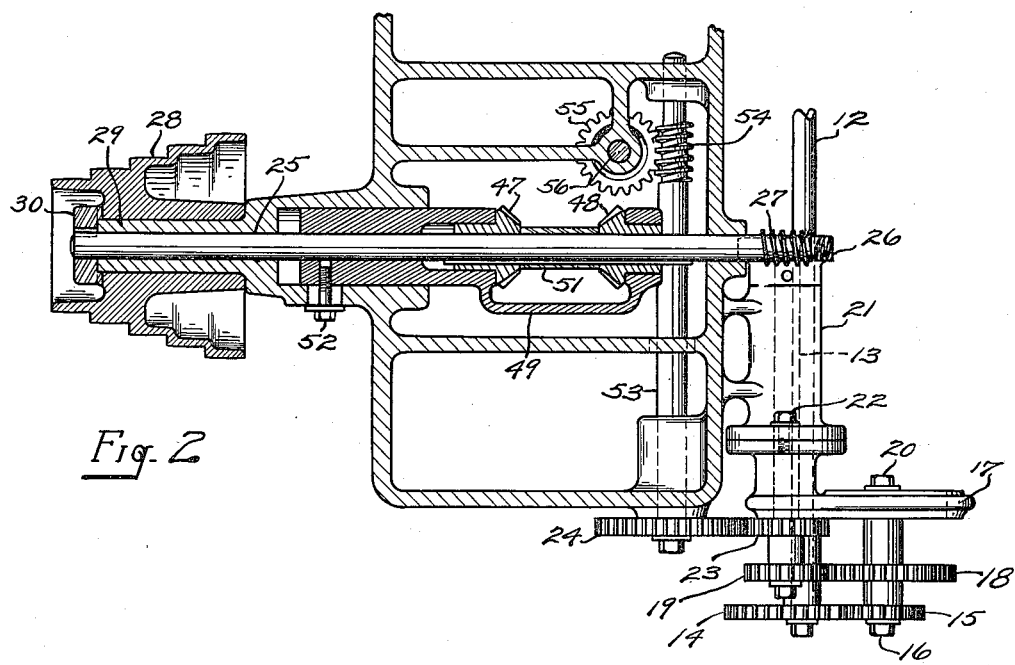
Figure 3:
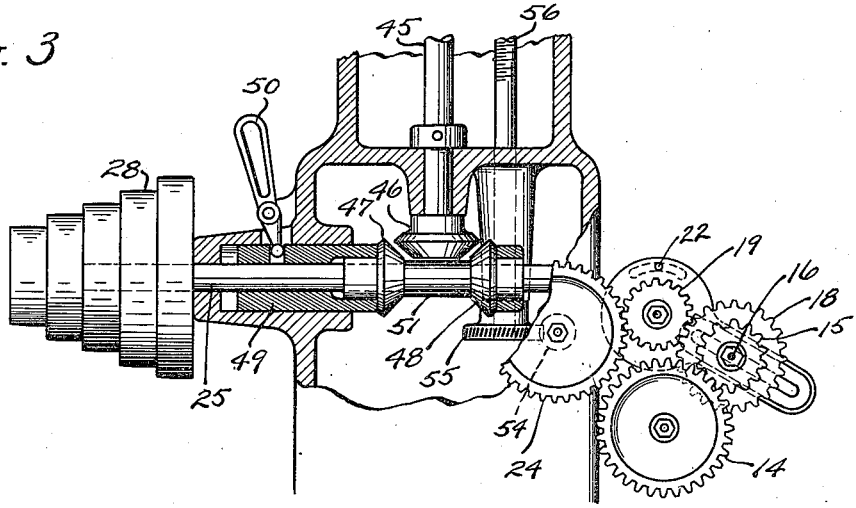

Referring to the drawings: Figure 1 is a side elevation of a gear cutting machine partly in section, to fully illustrate the interior mechanism. Fig. 2 is a section through the constant driving train taken at X X$_1$ of Fig. 1. Fig. 3 is a partial rear elevation partly in section to illustrate the driving mechanism.

In order to fully understand the invention, the formula for determining the relative ratios will be deduced after the following notation.

$P^{nc}$ = normal circular pitch of helical gear to be cut or the shortest distance between any two consecutive teeth and is measured on the normal to the helices and determines the size of the cutter to be used.

$P^{ND}$ = normal diametral pitch of the helical gear and cutter.

$P^C$ = circular pitch and is measured at right angles to the axis of the gear.

$P^L$ = linear pitch measured parallel to the axis of the gear.

N = number of teeth in the gear.
D = pitch diameter of the gear.
D° = outside diameter of the gear.
a = addendum.
X = angle of the helices with the axis of the gear.
L = lead of the helices or the advance in one turn.

The following formulæ are ordinarily used to determine the various parts of a helical gear when the usual known quantities are given, to wit: $P^{NC}$, N and X $$P^{NC} = \frac{\pi}{P^{ND}} \cdot P^C = \frac{P^{NC}}{\cos. X} \cdot P^L = \frac{P^{NC}}{\sin. X}$$

$$D = \frac{N}{P^{ND} \cos. X} = \frac{N P^{NC}}{\pi \cos. X} \cdot D^o = D + 2a$$

$$a = \frac{P^{NC}}{\pi} = \frac{1}{P^{ND}}$$

$$L = \frac{N P^{NC}}{\sin. X} = \frac{N P^C}{\tan. X} = \frac{N \pi}{P^{NC} \sin. X}$$

In cutting a helical gear upon any automatic helical gear cutting machine with a helical cutter, it is always necessary to rotate the blank in unison with the helical cutter at a speed depending upon the number of teeth to be cut, while at the same time, the cutter is advanced across the face of the blank in what results in a helical path upon the peripheral face of the blank, passing around the axis of the blank, such path being due in other machines to differential gears inserted in the cutter drive or indexing mechanism. This invention produces such a helical path by adding or subtracting a small increment to or from the rotary speed of the blank, or cutter, according to the style of gear to be cut, such increment depending on the relation of the forward motion of the helical cutter to the fixed relation between the rotations of the cutter and the blank.

To index in a machine, as will be described hereinafter, the formula for the number of teeth would be $\frac{K}{N}$ where K represents a constant depending upon the ratio of rotation of the work spindle to that of the helical cutter, and N represents the number of teeth to be cut. The lead L of the helices as shown above equals $$\frac{NP^{NC}}{\sin X} = \frac{NP^c}{\tan X} = \frac{N\pi}{P^{ND} \sin X}$$

Letting K′ equal the ratio of the feed to the work and V equal a variable depending upon the amount of forward motion of the helical cutter, that the material to be cut will stand, the value of the increment to be added or subtracted for the helical path, will become $$\frac{V}{K'L}$$

which by the substitution of the values of L becomes:

$$\frac{V \sin X}{K'NP^{NC}} = \frac{V \tan X}{K'NP^c} = \frac{VP^{ND} \sin X}{K'N\pi}$$

Adding or subtracting this increment to or from the formula for the number of teeth, we obtain the complete formulæ for setting the machine to cut helical gears, to wit:

$$\frac{K}{N} \pm \frac{V \sin X}{K'NP^{NC}}$$

or—

$$\frac{K}{N} \pm \frac{V \tan X}{K'NP^c}$$

or—

$$\frac{K}{N} \pm \frac{VP^{ND} \sin X}{K'N\pi}$$

which by algebraic transformation become:

$$\frac{KK'P^{NC} \pm V \sin X}{K'NP^{NC}}$$

or—

$$\frac{KK'P^c \pm V \tan X}{K'NP^c}$$

or—

$$\frac{KK' \pm VP^{ND} \sin X}{K'N\pi}$$

The specific formula to be used in a given case depends upon the known values. As hereinbefore stated the formula is based on a feeding motion relatively to the rotations of the helical cutter, if the feeding motion is desired relatively to the rotations of the gear blank it can be developed in a similar manner and is therefore omitted.

The formulæ just given contain plus and minus signs and they indicate the addition or subtraction of the increment above referred to, and may be explained as follows: When using a right-hand helical cutter to cut right-hand helical gears, or a left-hand helical cutter to cut left-hand helical gears, the plus sign is used, but with a right-hand cutter to cut left-hand gears, or a left-hand cutter to cut right-hand gears, the minus sign is used.

The helical cutter must be set at an angle equal to the angle of the helices of the blank, minus the angle of the helix of the cutter when using plus signs in the above formulæ, or at an angle equal to the angle of the helices of the gear plus the angle of the helix of the cutter when using the minus sign.

A concrete example may serve to illustrate the application of the formula. Let it be required to cut a right-hand helical gear with a right-hand helical cutter, said gear having 40 teeth with a normal circular pitch of 5/8 of an inch, the teeth having a helical angle of 30° with the axis of the gear in which case the lead will be 50 inches. The formula to be used in this case is:

$$\frac{KK'P^{NC} + V \sin X}{K'NP^{NC}}$$

The cutter feed change gears which determine the advance of the helical cutter in the direction parallel to the axis of the gear to be cut, can be in the ratio of 1 to 1, therefore $$V = \frac{1}{1} = 1.$$

Assuming the values of K as 120 and K′ as 6, and substituting these in the formula, we have $$\frac{(120 \times 6 \times 5/8) + \frac{1}{2}}{6 \times 40 \times 5/8} = \frac{901}{300}$$

On interpreting this result it will be found that for each rotation of the cutter, the index wheel makes 901/3600 of a rotation, while at the same time, the cutter feeds 1/720 of an inch. For 50 inches, the cutter will make 36000 rotations, while the blank makes 901 rotations. 40 rotations of the cutter normally, i. e., without the downward feed, will make 1 rotation of the blank. Therefore it will be seen that the blank will have made 901 rotations for 50 inches lead, 900 of which are due to the 36000 rotations of the cutter and the extra one rotation is due to the increment added to the blank rotations to produce the helices of the gear.

Proceeding now with the detailed description of the mechanism to practise the invention, the main frame 1 is provided with a stanchion 2 at one end thereof, preferably cast integral therewith. A work slide 3 is adjustably mounted upon the horizontal portion of the main frame 1, and is provided with a revoluble work spindle 4 therein, in which the work arbor 5 is secured, whereby the gear blank 6 may be centered and secured to the spindle 4 in the usual way. A worm or index wheel 7 is secured to the lower end of the work spindle 4 and rotated by the worm 8 in engagement therewith. The index worm 8 is mounted in the bearings 9 of the work slide 3, and is provided with a gear 10 secured to one end thereof to engage with a gear 11, which is slidably keyed to the index shaft 12.

The index shaft 12 extends along the side of the main frame and is mounted in bearings at either end thereof and connected to the index driving shaft 13 by means of a compound train of change wheels which are arranged in accordance with the formula hereinbefore described. The change gear 14 secured to the index shaft 12 meshes with a second change gear 15 rotatably mounted upon the stud 16 carried by the arm 17. A third change gear 18, also rotatably mounted on said stud 16 is arranged to rotate in unison with said second change gear 15 and meshes with the change gear 19 secured to and rotatable with the index driving shaft 13. The stud 16 is slidably arranged in the arm 17 to accommodate various diameter change gears and is secured thereto by the bolt 20. The arm 17, carrying the stud 16, is pivotally mounted upon the index driving shaft 13, and is secured in the various positions to the index driving shaft bearing 21 by the bolts 22. The index shaft 13 has also secured thereto and rotatable therewith, a feed change gear 23 meshing with the change wheel 24 to drive the feed of the helical cutter as hereinafter described. The index drive shaft 13 which imparts motion directly to the gear blank, receives its motion from the main shaft 25 through the worm wheel 26, secured thereto and the worm 27 secured to said main drive shaft 25 and meshing with said worm wheel 26. The ratio of the worm wheel 26 and worm 27 must be equal to, or a factor of, the ratio between the main driving shaft 25 and the helical cutter, preferably the former, so that for each rotation of the cutter, the index drive shaft will make a complete rotation or a multiple thereof. The main drive shaft 25 is rotated by a cone pulley 28 rotatably mounted upon a hub 29 of the main frame and connected to said drive shaft by the collar 30 which is keyed to the main shaft and cone.

The helical cutter 31 is secured in any suitable manner to the cutter shaft 32, mounted to rotate in the swivel carriage 33. The cutter carriage 34 upon which the swivel carriage 33 is mounted is vertically adjustable upon the stanchion 2 and is parallel to the axis of the gear blank. The swivel carriage is secured to the cutter carriage in any angular position in relation to the gear blank by means of bolts 35 the heads of which are in a circular T slot 36 of the cutter carriage. The cutter shaft 32 has secured thereto, and rotatable therewith, a driving gear 37 meshing with the pinion 38 which is fastened to a shaft 39, also rotatably mounted in the swivel carriage 33. Upon the other end of the pinion shaft 39, a bevel gear 40 is secured engaging with a bevel gear 41 which is fastened to a short center shaft 42 about which the swivel carriage 33 pivots. By pivoting the helical cutter about the center shaft 42, a rotatable connection through the bevel gears 40 and 41 is insured in any angular position of the cutter. A bevel gear 43 is secured to the other end of the center shaft 42 and meshes with the bevel gear 44 which is rotatably mounted in the cutter carriage and is slidably keyed to rotate with the vertical cutter drive shaft 45.

The cutter drive shaft 45 is mounted in bearings at either end thereof, provided in the stanchion 2, and has secured at its lower end a bevel gear 46 arranged to be engaged by either of the reversing bevel gears 47 and 48, slidably keyed to the main drive shaft 25 and carried by a yoke or bearing 49. The bevel gears 47 and 48 are for reversing the direction of rotation of the helical cutter, either one of which may be engaged with the vertical shaft bevel gear 46 by the handle 50 which operates the yoke 49. A separating sleeve 51 is provided to maintain the reversing bevel gears in their proper position. The yoke 49 can be secured to the frame in any position by the bolt 52.

The feed of the cutter parallel to the axis of the gear blank, is obtained through the change gears 23 and 24 from the index driving shaft 13, which rotates in synchronism with the helical cutter, as hereinbefore described. The change gear 24 is secured to the feed worm shaft 53 having preferably integral therewith, the feed worm 54 which engages with the feed worm wheel 55. The feed screw 56 which is mounted in bearings of the main frame, and engages a threaded portion 57 of the cutter carriage 34, has secured thereto and is rotated by the feed worm wheel 55.

From the structure as described, it will be seen that rotary motion is transmitted directly from the main shaft to the gear blank and from the main shaft to the cutter, and the feeding motion is obtained from the index driving shaft which rotates in synchronism with the cutter. As hereinbefore stated the feed can also be taken from the index shaft or from a shaft after the index change gears. The feed increment added to or subtracted from the rotations of the gear blank can also be added to or subtracted from the rotations of the cutter by introducing change wheels between the main drive shaft and cutter. The index change gears would then only be arranged according to the number of teeth to be cut.

The method of arranging the apparatus described to cut helical gear wheels with a helical cutter, according to the described method is as follows: The gear blank is mounted upon and secured to the work spindle; the cutter is secured to the cutter spindle and the swivel carriage is adjusted to the proper angle, with relation to the gear and according to the angle of the helices to be cut, and is secured in such position by bolts. The feed change gears are selected in accordance with the material of the blank and the angle of the helices and placed in position. The index change gears are placed between the index driving and index shafts, having previously determined their ratio from the formula hereinbefore deduced. The work blank is adjusted by the screw 58 and hand wheel 59 for the proper depth to be cut. The teeth of the gear will then be cut by one passage of the cutter across the face of the blank.

Having described our method of cutting helical gear wheels with a helical cutter, we claim as new and desire to secure by Letters Patent:

1. A method of cutting helical gear wheels consisting of rotating a gear blank and helical cutter with relative speeds, through a single continuous and unvarying motion, from a driver to said gear blank and cutter respectively, said relative rotation being determined by the ratio of the number of teeth to be cut to the number of threads in the cutter, plus or minus an increment dependent upon the amount of feed desired, and imparting a feeding motion substantially parallel to the axis of the gear blank and relative to said single continuous and unvarying motion, to produce helical teeth on said blank that have a directrix coinciding with the axis of the gear.

2. A method of cutting helical gear wheels consisting of rotating a gear blank and helical cutter with relative speeds, through a single continuous and unvarying motion, from a driver to said gear blank and cutter respectively, said relative rotations being determined by the ratio of the number of teeth to be cut to the number of threads in the cutter, plus or minus an increment dependent upon the amount of feed desired for each rotation of the cutter, and imparting a feeding motion substantially parallel to the axis of the gear blank and relative to the rotations of the cutter, to produce helical teeth on said blank that have a directrix coinciding with the axis of the gear blank.

3. A method of cutting helical gear wheels, consisting of rotating a gear blank and helical cutter with relative speeds, through a single, continuous and unvarying motion from a driver to said gear blank and cutter respectively, said relative rotations being determined by the ratio of the linear pitch of said gear, plus or minus the feed desired for each rotation of said cutter, to the lead of said gear, and imparting a feeding motion substantially parallel to the axis, and relative to the rotations of said cutter, to produce helical teeth on said gear that have a directrix coinciding with the axis of said blank.

FREDERICK L. EBERHARDT.
WILLIAM F. ZIMMERMANN.

Witnesses:
  H. W. JACOBSON,
  B. E. BARNES.